United States Patent
Arndt et al.

(10) Patent No.: US 6,973,510 B2
(45) Date of Patent: Dec. 6, 2005

(54) DMA WINDOWING IN AN LPAR ENVIRONMENT USING DEVICE ARBITRATION LEVEL TO ALLOW MULTIPLE IOAS PER TERMINAL BRIDGE

(75) Inventors: Richard Louis Arndt, Austin, TX (US); Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/953,920

(22) Filed: Sep. 29, 2004

(65) Prior Publication Data

US 2005/0055470 A1  Mar. 10, 2005

Related U.S. Application Data

(60) Division of application No. 09/766,764, filed on Jan. 23, 2001, now Pat. No. 6,823,404, which is a continuation-in-part of application No. 09/589,665, filed on Jun. 8, 2000, now Pat. No. 6,629,162.

(51) Int. Cl.$^7$ ............................. G06F 3/00; G06F 3/06
(52) U.S. Cl. ............................. 710/36; 710/37; 710/8; 710/9
(58) Field of Search ..................... 710/28, 15, 36, 710/16, 5, 62, 37, 8, 9, 3, 4; 712/13

(56) References Cited

U.S. PATENT DOCUMENTS

| | | | |
|---|---|---|---|
| 4,843,541 A * | 6/1989 | Bean et al. | 710/36 |
| 5,659,756 A | 8/1997 | Hefferon et al. | |
| 5,996,026 A | 11/1999 | Onodera et al. | |
| 6,438,671 B1 | 8/2002 | Doing et al. | |
| 6,584,530 B2 | 6/2003 | Kondo et al. | |
| 6,629,162 B1 * | 9/2003 | Arndt et al. | 710/28 |
| 6,643,727 B1 * | 11/2003 | Arndt et al. | 710/15 |
| 6,658,591 B1 * | 12/2003 | Arndt | 712/13 |

FOREIGN PATENT DOCUMENTS

| | | |
|---|---|---|
| CA | 2 344 597 | 12/2001 |
| JP | 61-026152 | 2/1986 |
| JP | 10-187594 | 7/1998 |
| JP | 2001-282753 | 10/2001 |
| JP | 2002-041306 | 2/2002 |

* cited by examiner

*Primary Examiner*—Kim Huynh
*Assistant Examiner*—Joshua D. Schneider
(74) *Attorney, Agent, or Firm*—Mark E. McBurney; Dillon & Yudell LLP

(57) ABSTRACT

A method, system, and apparatus for preventing input/output (I/O) adapters used by an operating system (OS) image, in a logically partitioned data processing system, from fetching or corrupting data from a memory location allocated to another OS image within the data processing system is provided. A hypervisor prevents transmission of data between an input/output adapter in one of the logical partitions and memory locations assigned to other logical partitions during a direct memory access (DMA) operation by assigning each of the input/output adapters a range of I/O bus DMA addresses. The I/O adapters (IOAs) are connected to PCI host bridges via terminal bridges. A single terminal bridge may support multiple IOAs, in which case every terminal bridge has a plurality of sets of range registers, each associated with a respective one of the IOAs to which it is connected. An arbiter is provided which selects one of the input/output adapters to use the PCI bus. The terminal bridge can examine the grant signals from the arbiter to the IOAs, to determine which set of range registers is to be used.

8 Claims, 7 Drawing Sheets

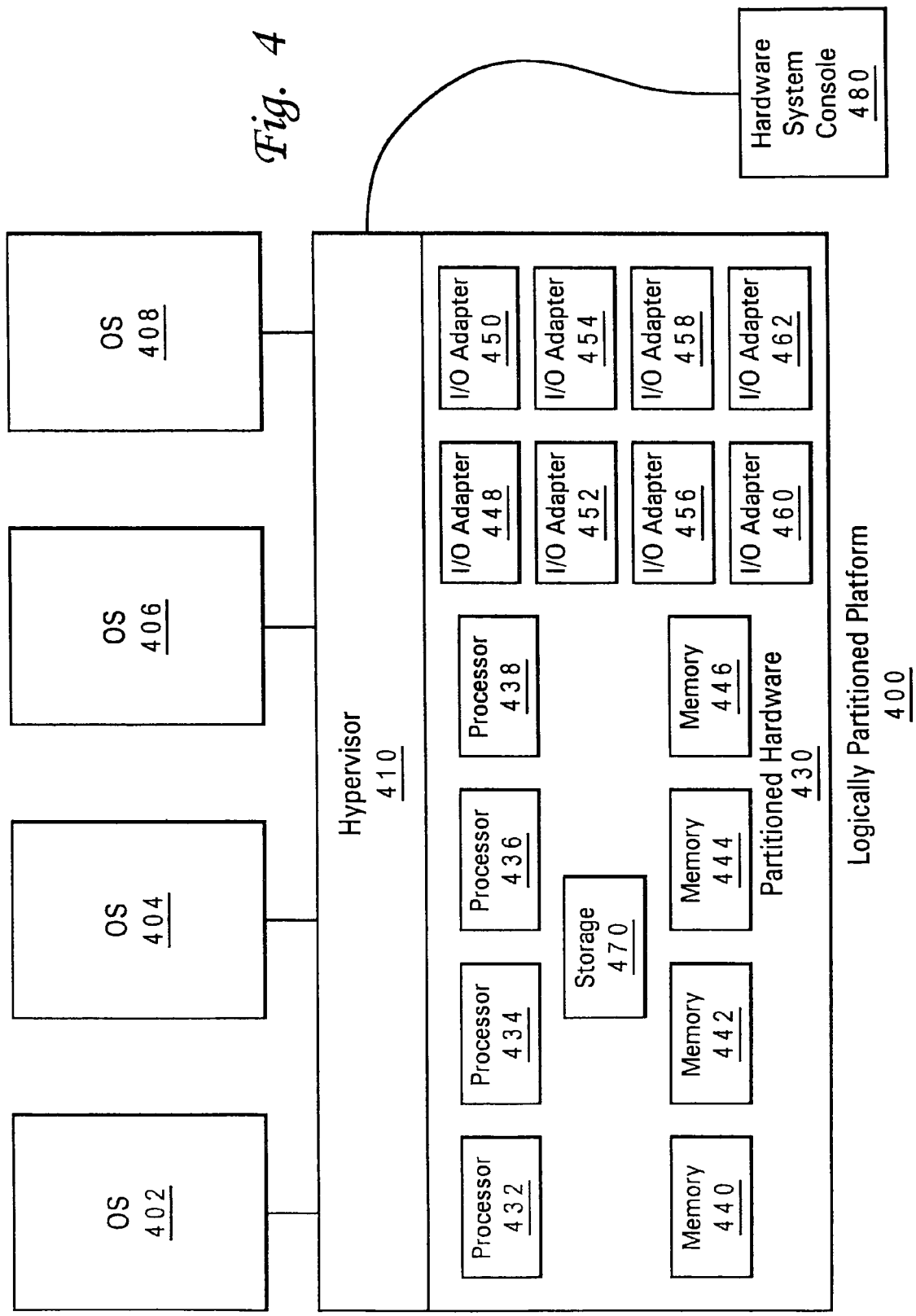

| IOA 1 | |
|---|---|
| | I/O bus DMA address 1-4 |
| IOA 2 | |
| | I/O bus DMA address 5-8 |
| IOA 3 | |
| | I/O bus DMA address 9-12 |

I/O Bus DMA Address Range Table
500

*Fig. 5A*

| OS 1 | |
|---|---|
| | IOA 1 |
| | IOA 3 |
| | Mem 1-20 |
| OS 2 | |
| | IOA 2 |
| | Mem 21-40 |

Allocation Table
520

*Fig. 5B*

| Mem 5-8 | I/O bus DMA addresses 1-4 |
|---|---|
| Mem 11-13 | I/O bus DMA addresses 9-11 |
| Mem 25-26 | I/O bus DMA addresses 5-6 |

TCE Table
550

*Fig. 5C*

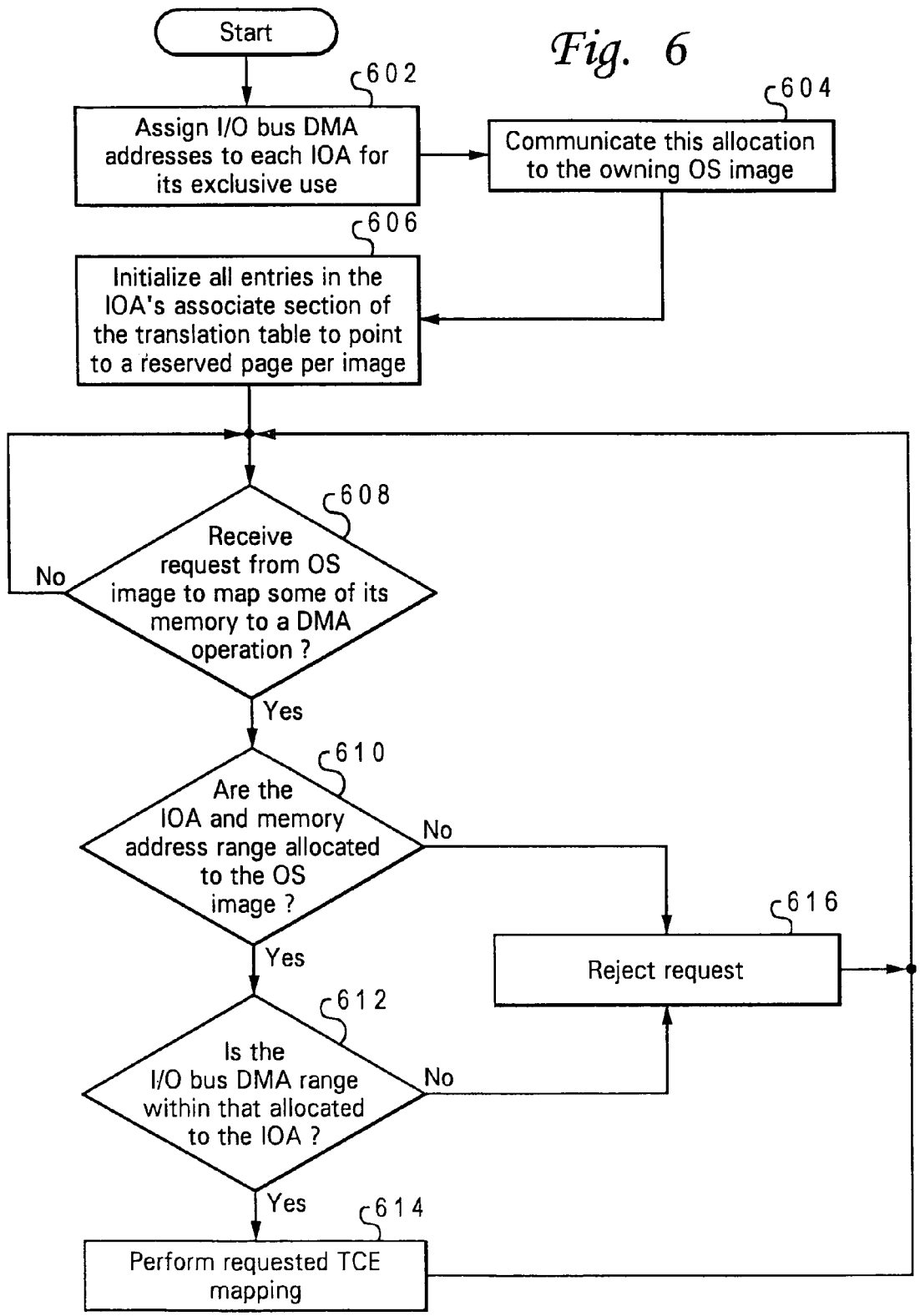

DMA WINDOWING IN AN LPAR ENVIRONMENT USING DEVICE ARBITRATION LEVEL TO ALLOW MULTIPLE IOAS PER TERMINAL BRIDGE

CROSS-REFERENCE TO RELATED APPLICATION

The present application is a divisional of U.S. patent application Ser. No. 09/766,764, filed on Jan. 23, 2001 now U.S. Pat. No. 6,823,404, and entitled, "DMA Windowing in an LPAR Environment Using Device Arbitration Level to Allow Multiple IQAs per Terminal Bridge," which is a continuation-in-part of U.S. patent application Ser. No. 09/589,665 filed Jun. 8, 2000, now U.S. Pat. No. 6,629,162 hereby incorporated by reference.

BACKGROUND OF THE INVENTION

1. Technical Field

The present invention relates generally to the field of computer architecture and, more specifically, to methods and systems for managing resources among multiple operating system images within a logically partitioned data processing system.

2. Description of Related Art

A logical partitioning (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform are protected from each other such that software errors on one logical partition can not affect the correct operation of any of the other partitions. This is provided by allocating a disjoint set of platform resources to be directly managed by each OS image and by providing mechanisms for ensuring that the various images cannot control any resources that have not been allocated to them. Furthermore, software errors in the control of an OS's allocated resources are prevented from affecting the resources of any other image. Thus, each image of the OS (or each different OS) directly controls a distinct set of allocable resources within the platform.

One problem with standard computer systems is that the input/output (I/O) sub-systems are designed with several I/O adapters (IOAs) sharing a single I/O bus. an OS image contains device drivers that issue commands that directly control their IOA. One of these commands contains Direct Memory Access (DMA) addresses and lengths for the I/O operation being programmed. Errors in either the address or length parameters could send or fetch data to or from the memory allocated to another image. The result of such an error would be the corruption or theft of the data of another OS image within the data processing system. Such occurrence would be a violation of the requirements of a logically partitioned data processing system. Therefore, a method, system, and apparatus for preventing the I/O used by one OS image within a logically partitioned system from corrupting or fetching data belonging to another OS image within the system is desirable.

The foregoing problem may be exacerbated by the presence of a high number of I/O adapters in the system, which can make it even more difficult to determine which I/O adapter belongs to which LPAR partition, or, if adapters are in different partitions, to determine what address ranges are legitimate for each I/O adapter. It would, therefore, be further advantageous to devise such a method, system and apparatus which accommodates the use of a large number of I/O adapters, and which could utilize existing hardware to provide this functionality without significant added expense.

SUMMARY OF THE INVENTION

The foregoing objects are achieved in a method, system, and apparatus for preventing input/output (I/O) adapters used by an operating system (OS) image, in a logically partitioned data processing system, from fetching or corrupting data from a memory location allocated to another OS image within the data processing system. In one embodiment, the data processing system includes a plurality of logical partitions, a plurality of operating systems (OSs), a plurality of memory locations, a plurality of I/O adapters (IOAs), and a hypervisor. Each of operating system images is assigned to a different one of the logical partitions. Each of the memory locations and each of the input/output adapters is assigned to one of the logical partitions. The hypervisor prevents transmission of data between an input/output adapter in one of the logical partitions and memory locations assigned to other logical partitions during a direct memory access (DMA) operation by assigning each of the input/output adapters a range of I/O bus DMA addresses. When a request, from an OS image, to map some of its memory to for a DMA operation is received, the hypervisor checks that the memory address range and the I/O adapter are allocated to the requesting OS image and that the I/O bus DMA range is within the that allocated to the I/O adapter. If these checks are passed, the hypervisor performs the requested mapping; otherwise the request is rejected.

The invention further contemplates the use of terminal bridges to support multiple IOAs. In this embodiment, every terminal bridge has a plurality of sets of range registers, each associated with a respective one of the IOAs to which it is connected. An arbiter is provided which selects one of the input/output adapters to use the PCI bus. The terminal bridge can examine the grant signals from the arbiter to the IOAs, to determine which set of range registers is to be used.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts a block diagram of a logically partitioned platform in which the present invention may be implemented;

FIGS. 5A–5C depict an I/O bus DMA address range table, an allocation table, and a TCE table in accordance with the present invention;

FIG. 6 depicts a flowchart illustrating an exemplary process for preventing an OS image from sending or fetching data from a memory allocated to another OS image during a direct memory access (DMA) in accordance with the present invention.

DETAILED DESCRIPTION OF PREFERRED EMBODIMENT

Figure 1:
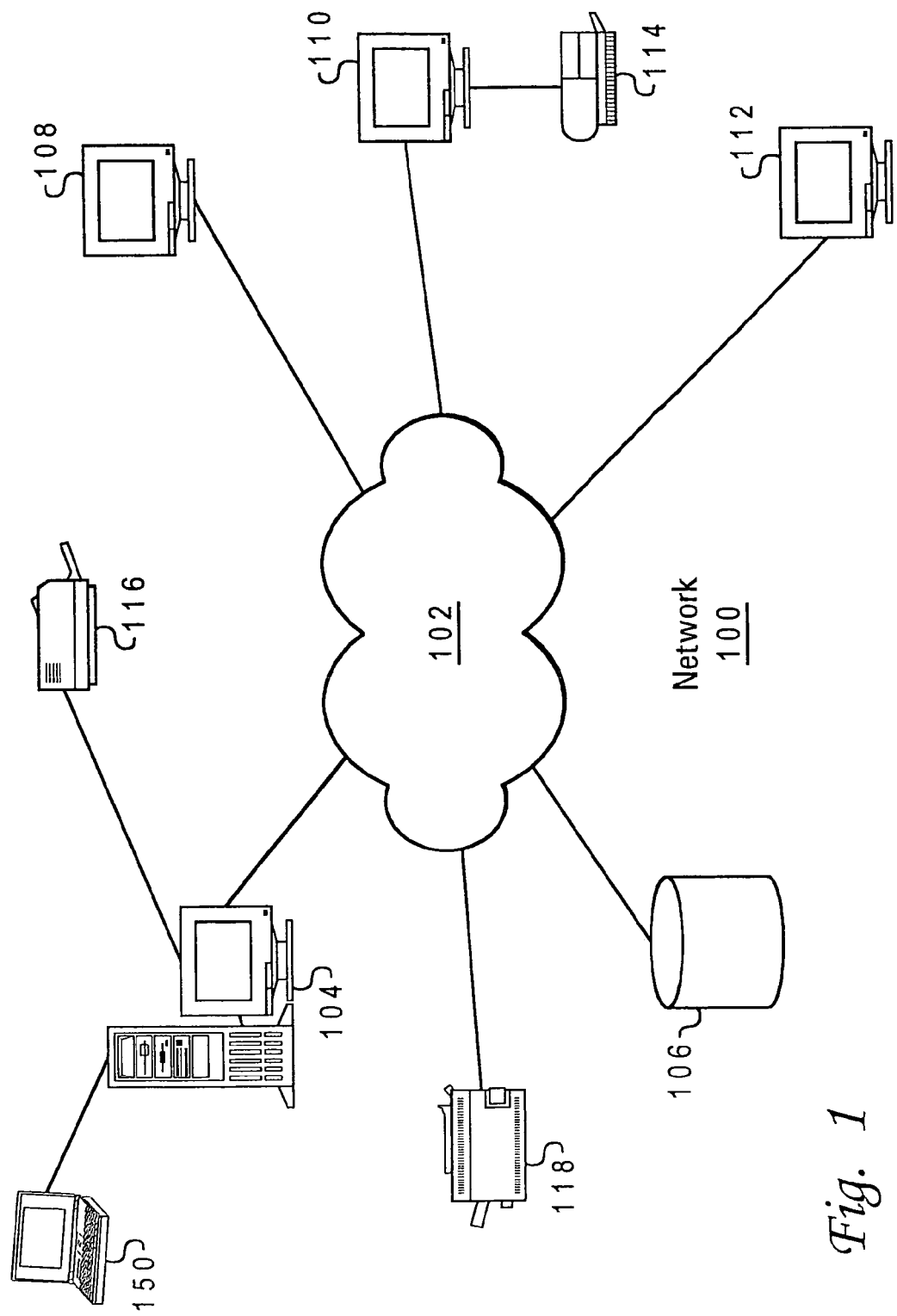
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104 as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
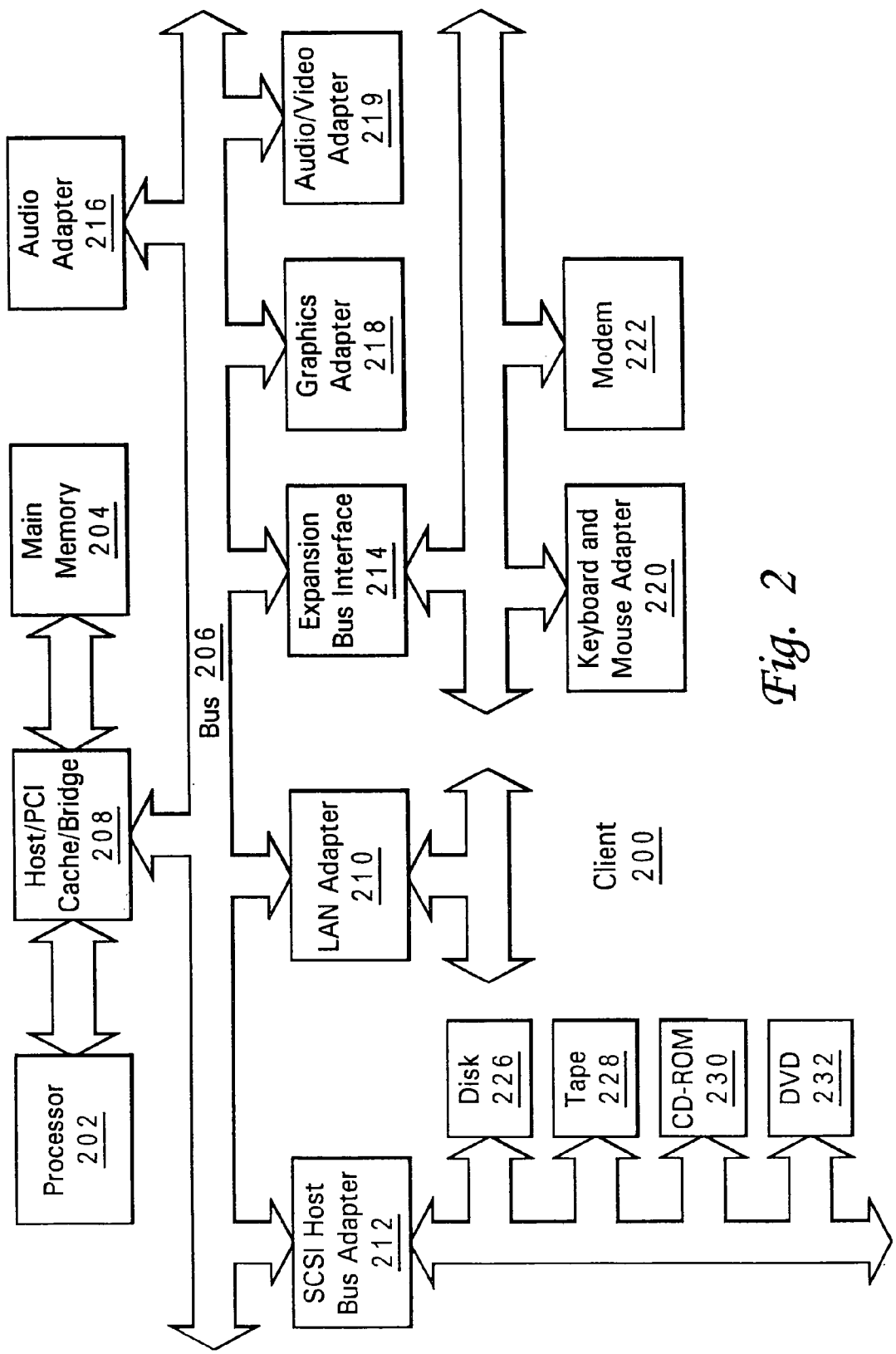
FIG. 2 is a block diagram of a data processing system in accordance with the present invention is illustrated.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220 and modem 222. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
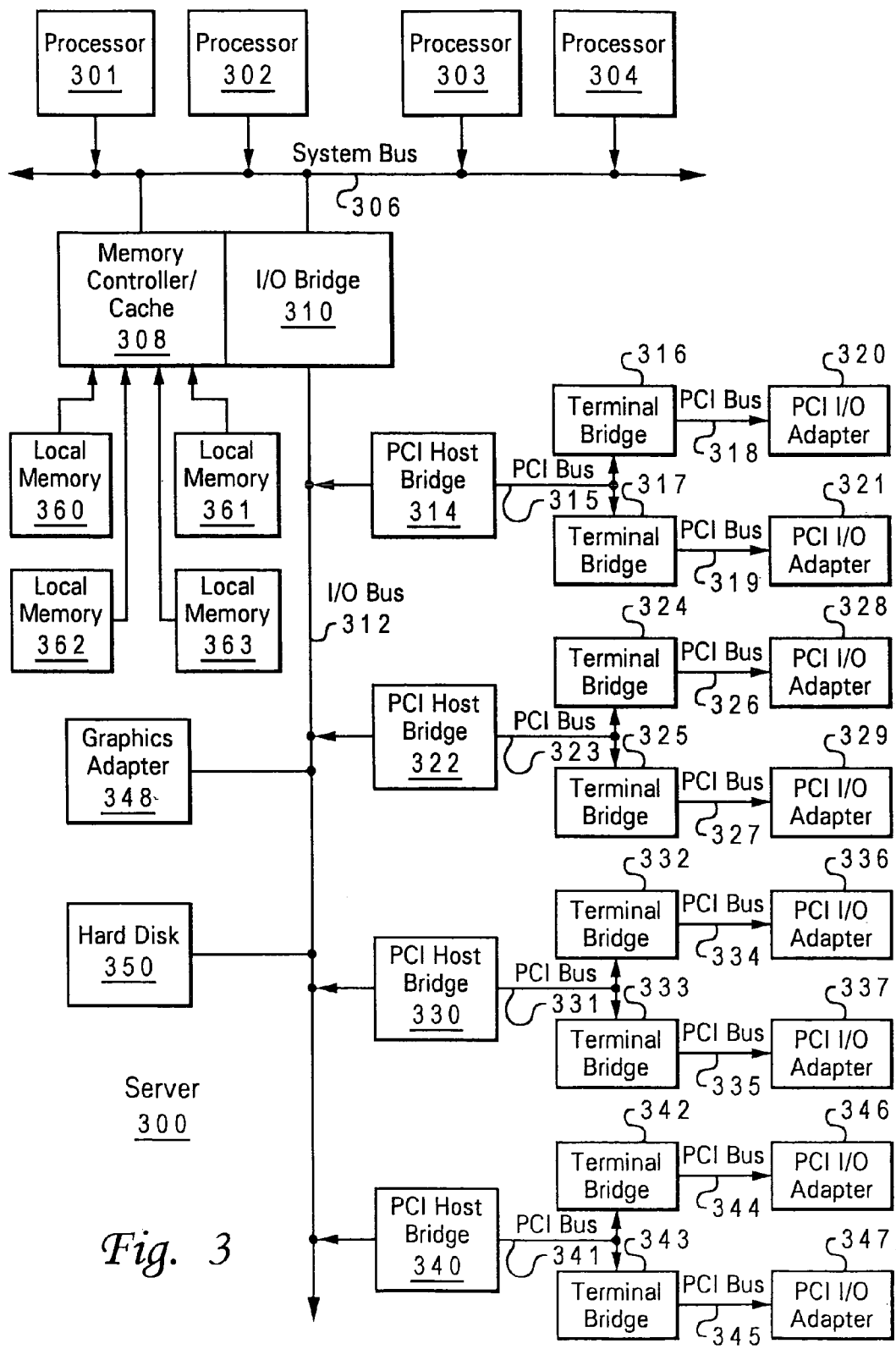
FIG. 3 depicts a block diagram of a data processing system, which may be implemented as a logically partitioned server, in accordance with the present invention.

With now reference to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of theses multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000Ö operating system may be operating within logical partition P1. Windows 2000 is a product and trademark of Microsoft Corporation of Redmond, Wash.

Peripheral component interconnect (PCI) Host Bridge 314 connected to I/O bus 312 provides an interface to PCI local bus 315. A number of Terminal Bridges 316–317 may be connected to PCI bus 315. Typical PCI bus implementations will support four to ten Terminal Bridges for providing expansion slots or add-in connectors. Each of Terminal Bridges 316–317 is connected to a PCI/I/O Adapter 320–321 through a PCI Bus 318–319. Each I/O Adapter 320–321 provides an interface between data processing system 300 and input/output devices such as, for example, other network computers, which are clients to server 300. In one embodiment, only a single I/O adapter 320–321 may be connected to each Terminal Bridge 316–317. Each of Terminal Bridges 316–317 is configured to prevent the propagation of errors up into the PCI Host Bridge 314 and into higher levels of data processing system 300. By doing so, an error received by any of Terminal Bridges 316–317 is isolated from the shared buses 315 and 312 of the other I/O adapters 321, 328–329, 336–337, and 346–347 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI Host Bridges 322, 330, and 340 provide interfaces for additional PCI buses 323, 331, and 341. Each of additional PCI buses 323, 331, and 341 are connected to a plurality of Terminal Bridges 324–325, 332–333, and 342–343 which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

With reference now to FIG. 4, a block diagram of an exemplary logically partitioned platform is depicted in which the present invention may be implemented. The hardware in logically partitioned platform 400 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of Input/output (I/O) adapters 448–462, and a storage unit 470. Each of the processors 442–448, memory units 440–446, and I/O adapters 448–462 may be assigned to one of multiple partitions within logically partitioned platform 400, each of which corresponds to one of operating systems 402–408.

Hypervisor 410, implemented as firmware, creates and enforces the partitioning of logically partitioned platform 400. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Hypervisor 410 provides a secure direct memory access (DMA) window, per IOA, such as, for example, IOA 328 in FIG. 3, on a shared I/O bus, such as, for example, I/O bus 312 in FIG. 3, into the memory resources allocated to its associated OS image, such as, for example, OS image 402 in FIG. 4. The secure DMA window provides access from an IOA to memory which is allocated to the same partition as the IOA, while preventing the IOA from getting access to the memory allocated to a different partition.

In one embodiment, as implemented within an RS/6000 Platform Architecture, the hypervisor makes use of two existing hardware mechanisms. These hardware mechanisms are called the translation control entry (TCE) facility and the DMA range register facility Bridge. In one embodiment, the TCE facility is implemented in the PCI Host Bridge, such as PCI Host Bridges 314, 322, 330, and 340 in FIG. 3, and the range register facility is implemented in the Terminal Bridge, such as Terminal Bridges 316–317, 324–325, 332–333, and 342–343.

The TCE facility (not shown) is a facility for the I/O which is analogous to the virtual memory address translation facility provided by most processors today. That is, the TCE facility provides a mechanism to translate a contiguous address space on the I/O bus to a different and possibly non-contiguous address space in memory. It does this in a manner similar to the processor's translation mechanism, and thus breaks the address space of the memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an I/O operation starts on the bus, the TCE facility accesses the entry for that page in the TCE table, and uses the data in that entry as the most significant bits of the address to access memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in memory is addressed, and the address bits taken from the I/O bus determines the address within the page.

The bus address ranges that the IOAs are allowed to place onto the I/O bus are limited by the range register facility. The range register facility contains a number of registers that hold addresses that are compared to what the IOA is trying to access. If the comparison shows that the IOA is trying to access outside of the range of addresses that were programmed into the range registers by the firmware, then the bridge will not respond to the IOA, effectively blocking the IOA from accessing addresses that it is not permitted to access. In this embodiment, these two hardware mechanisms are placed under the control of the hypervisor.

When platform 400 is initialized, a disjoint range of I/O bus DMA addresses is assigned to each of IOAs 448–462 for the exclusive use of the respective one of IOAs 448–462 by hypervisor 410. Hypervisor 410 then configures the Terminal Bridge range register (not shown) facility to enforce this exclusive use. Hypervisor 410 then communicates this allocation to the owning one of OS images 402–408. Hypervisor also initializes all entries in a particular IOA's associated section of the TCE table to point to a reserved page per image that is owned by the OS image that is allocated that IOA, such that unauthorized accesses to memory by an IOA will not create an error that could affect one of the other OS images 402–408.

When an owning one of OS images 402–408 requests to map some of its memory for a DMA operation, it makes a call to the hypervisor 410 including parameters indicating the IOA, the memory address range, and the associated I/O bus DMA address range to be mapped. The hypervisor 410 checks that the IOA and the memory address range are allocated to the owning one of OS images 402–408. The hypervisor 410 also checks that the I/O bus DMA range is within the range allocated to the IOA. If these checks are-passed, the hypervisor 410 performs the requested TCE mapping. If these checks are not passed, he hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a computer 480, known as a hardware system console.

Hardware system console 480 is connected directly to logically partitioned platform 400 as illustrated in
FIG. 4, or may be connected to logically partitioned platform through a network, such as, for example, network 102 in FIG. 1. Hardware system console 480 may be, for example a desktop or laptop computer, and may be implemented as data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

With reference now to FIGS. 5A–5C, an exemplary allocation table, I/O bus DMA address range table, and translation control entry table are depicted in accordance with the present invention. In FIG. 5A, an example of an I/O bus DMA address range table 500 is illustrated. In this example, the first input/output adapter IOA 1 has been assigned the I/O bus DMA address range of I/O bus DMA addresses 1–4, the second input/output adapter IOA 2 has been assigned the range of I/O bus DMA addresses 5–8, and the third input/output adapter IOA 3 has been assigned the range of I/O bus DMA addresses 9–12. In allocation table 520 in FIG. 5B, the first operating system image OS 1 has been allocated IOA 1, IOA 3, and memory locations 1–20. The second operating system image OS 2 has been allocated IOA 2 and memory locations 21–40.

In translation control entry (TCE) table 550 depicted in FIG. 5C, memory locations 5–8 have been mapped to I/O bus DMA addresses 1–4, memory locations 11–13 have been mapped to I/O bus DMA addresses 9–11, and memory locations 25–26 have been mapped to I/O bus DMA addresses 5–6. If, for example, the first operating system OS 1 requested that memory locations 21–24 be mapped to I/O bus DMA addresses 1–4 for the first input/output adapter IOA 1 or that memory locations 1–5 be mapped to I/O bus DMA addresses 5–8 for the second input/output adapter IOA 2, the hypervisor, such as hypervisor 400 in FIG. 4, would reject either request. In the first case, the request is rejected because, although the I/O bus DMA addresses are within the range allocated to the first input/output adapter IOA 1 and the first input/output adapter IOA 1 is allocated to the first operating system OS 1, the memory locations are allocated to the second operating system OS 2. In the second case, the second input/output adapter IOA 2 is not allocated to the first operating system OS 1. Thus, the first operating system is prevented from modifying or otherwise affecting data belonging to the second operating system OS 2.

However, if, for example, the first operating system requested to map the memory locations 18 to I/O bus DMA address 12 corresponding to the third input/output adapter IOA 3, the hypervisor would perform such request and modify the TCE table 550 accordingly, since such request would not interfere with the memory space or input/output adapters allocated to the second operating system OS 2.

With reference now to FIG. 6, a flowchart illustrating an exemplary process for preventing an OS image from sending or fetching data from a memory allocated to another OS image during a direct memory access (DMA) is depicted in accordance with the present invention. When the logically partitioned platform, such as platform 500 in FIG. 5A, is initialized, the hypervisor assigns a disjoint range of I/O bus DMA addresses to each IOA for its exclusive use (step 602). In an embodiment implemented within an RS/6000 platform, the hypervisor configures the DMA range register facility of the Terminal Bridge to enforce this exclusive use. The hypervisor then communicates this allocation to the owning OS image (step 604). The hypervisor also initializes all entries in the IOAs associated section of the Translation Control Entry (TCE) facility table to point to a reserved page per image that is owned by the OS image to which the IOA is assigned, such that unauthorized accesses will not cause an error that will affect another OS image (step 606).

The hypervisor then determines whether a request from an OS image to map some of the memory belonging to that respective OS image to a DMA operation (step 608). The OS image makes the request by a call to the hypervisor that includes parameters indicating the IOA, the memory address range, and the associated I/O bus DMA address range to be mapped. If such a request has not been received, then the hypervisor continues to wait for requests. If such a request has been received, then the hypervisor determines whether the IOA and memory address range in the request are allocated to the requesting OS image (step 610). If the IOA and/or memory address range received in the request from the OS image are not allocated to the requesting OS image, then the request is rejected (step 616) and the process continues at step 608.

If the IOA memory and the address range are allocated to the requesting OS image, then the hypervisor determines whether the I/O bus DMA range is within the range that is allocated to the IOA (step 612). If the I/O bus DMA range is not within the range that is allocated to the IOA, then the request is rejected (step 616) and the process continues at step 608. If the I/O bus DMA range is within the range that is allocated to the IOA, then the requested TCE mapping is performed and the process continues with step 608.

In the foregoing embodiment, one terminal bridge is provided for each IOA, and when a given IOA gains control of the bus to perform the DMA operation, the terminal bridge compares the address being requested against a set of registers in a range register facility in the terminal bridge. This approach is adequate for the case where there is a one-to-one correspondence of the IOA to the terminal bridge, but is more problematic if the user wants to place multiple IOAs under the same terminal bridge for purposes of reducing system costs.

Placing multiple IOAs under one terminal bridge creates the problem of not knowing which IOA belongs to which LPAR partition and, if they are in different partitions, how to know how to determine what address ranges are legitimate for each IOA. The present invention may circumvent this limitation, and thus implement LPAR system with less cost by sharing terminal bridges among multiple IOAs.

Figure 7:
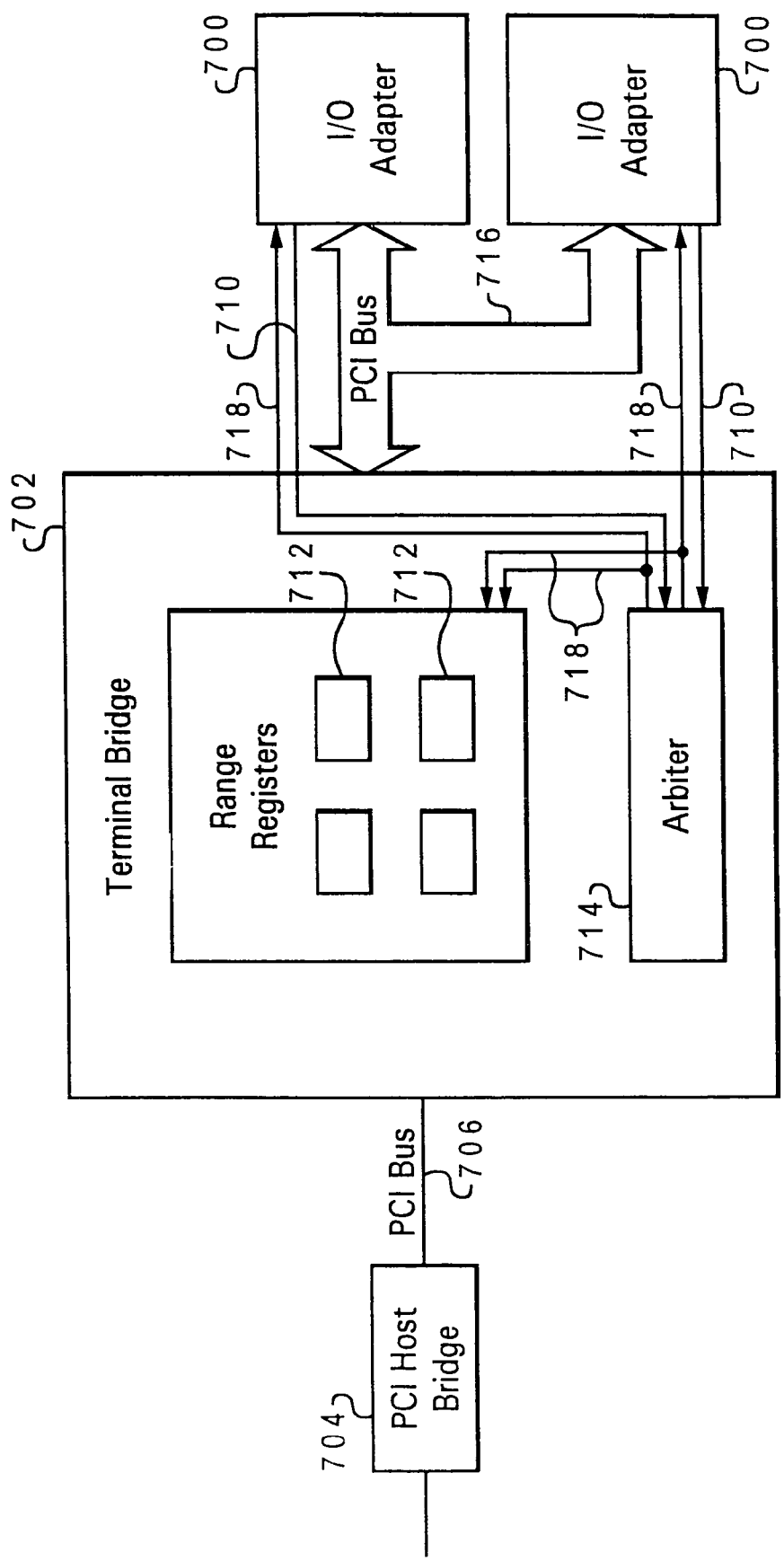
FIG. 7 depicts a block diagram illustrating a further embodiment of the present invention wherein multiple input/output adapters are supported by a single terminal bridge having multiple sets of range registers.

As illustrated in FIG. 7, a further embodiment of the present invention solves this problem by having one set of range registers per IOA, and then using an arbitration grant line to the IOA to determine who has control of the bus at the time of the transaction. In this embodiment, multiple IOA's 700 are connected to a single terminal bridge 702, which is in turn connected to a PCI host bridge 704 via PCI bus 706. More than one terminal bridge 702 may be connected to PCI host bridge 704, similar to the construction of FIG. 3, although only one terminal bridge is shown in FIG. 7. PCI host bridge 704 is again connected to the main I/O bus.

The control logic of terminal bridge 702 includes an arbiter 714 which controls access to PCI bus 716. The bus request signals 710 from the IOAs 700 are fed into the arbiter 714 which then determines which IOA gets to use the bus and then the arbiter 714 signals that IOA via a GRANT signal 718. By examining these GRANT signals 718, the terminal bridge 702 can use the appropriate set of range registers 712 that are assigned to that particular IOA. If an IOA receives a GRANT from the arbiter and the address that the IOA is attempting to use is outside of the range indicated by the selected range registers, then the terminal bridge signals the IOA to abort the operation, and thus prevents the IOA from accessing memory that it is not allowed to access.

It is also possible that an arbiter is external to the terminal bridge, in which case the GRANT lines to the IOAs must be brought into the terminal bridge as input signals. It is also possible that the terminal bridge is implemented as part of the host bridge.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims. Also, while the present invention has been described in the context of a fully functioning data processing system, those skilled in the art will appreciate that the processes of the present invention are capable of being distributed in the form of a computer readable medium of instructions and a variety of forms and that the present invention applies equally regardless of the particular type of signal-bearing media actually used to carry out the distribution. Examples of computer-readable media include recordable-type media such a floppy disc, a hard disk drive, a RAM, and CD-ROMs and transmission-type media such as digital and analog communications links.

What is claimed is:

1. A method of preventing an operating system image within a logically partitioned data processing system from fetching or corrupting data from a memory location allocated to another operating system image within the data processing system, the method comprising the steps of:

receiving a request from the operating system image to access a given one of a plurality of input/output adapters each associated with a different one of a plurality of logical partitions of the data processing system, wherein the input/output adapters are connected to a single terminal bridge; and accessing the given input/output adapter using memory mapped to the operating system image by utilizing one of a plurality of sets of range registers of the terminal bridge, each associated with a respective one of the input/output adapters.

2. The method of claim 1 wherein said accessing step includes the steps of:

transmitting the request to a PCI host bridge using an input/output bus; and conveying the request from the PCI host bridge to the terminal bridge using a PCI bus.

3. The method of claim 1 wherein said accessing step further utilizes an arbiter which selects one of the input/output adapters, to assign one of the sets of range registers based on a grant signal from the arbiter.

4. The method of claim 1 further comprising the step of associating each of the sets of range registers with direct memory access addresses which limit access by the input/output adapters.

5. The method of claim 1 further comprising the step of programmably loading the sets of range registers.

6. A computer program product for use in a data processing system for preventing an operating system image within a logically partitioned data processing system from fetching or corrupting data from a memory location allocated to another operating system image within the data processing system, the computer program product comprising:

a storage medium; and program instructions stored on said storage medium for receiving a request from the operating system image to access a given one of a plurality of input/output adapters each associated with a different one of a plurality of logical partitions of the data processing system, wherein the input/output adapters are connected to a single terminal bridge, and for accessing the given input/output adapter using memory mapped to the operating system image, by utilizing one of a plurality of sets of range resisters of the terminal bridge, each associated with a respective one of the input/output adapters.

7. The computer program product of claim 6 wherein the request comprises an input/output adapter identity, a memory address range to be mapped, and a direct memory access range, and said program instructions further determine that the identity of the input/output adapter, the memory address range, and the direct memory access range are allocated to the operating system image.

8. The computer program product of claim 6 wherein said program instructions further load the sets of range registers.

* * * * *